United States Patent [19]
Kubokura

[11] 3,910,211
[45] Oct. 7, 1975

[54] DRIVING SYSTEM FOR A SEWING MACHINE

[75] Inventor: Kuniaki Kubokura, Hitachi, Japan

[73] Assignee: Hitachi, Ltd., Japan

[22] Filed: Jan. 17, 1974

[21] Appl. No.: 434,237

[30] Foreign Application Priority Data
Feb. 22, 1973  Japan................................ 48-8610

[52] U.S. Cl............................ 112/219 A; 112/219 A
[51] Int. Cl............................................. D05b 59/22
[58] Field of Search............ 112/219 A, 219 R, 220, 112/218 R, 67, 87

[56] References Cited
UNITED STATES PATENTS

| | | | |
|---|---|---|---|
| 2,424,102 | 7/1947 | Vesconte et al. ................ | 112/218 R |
| 2,920,221 | 1/1960 | Schwab....................... | 112/219 A X |
| 3,174,450 | 3/1965 | Becker et al................... | 112/219 A |

*Primary Examiner*—H. Hampton Hunter
*Attorney, Agent, or Firm*—Craig & Antonelli

[57] ABSTRACT

A driving system for the sewing machine is disclosed which comprises a motor, a flywheel mounted on an end of the rotary shaft of the motor, a driving part of an electromagnetic coupling in the shape of a drum provided on the end face of the flywheel, a driven part of the electromagnetic coupling rotatably mounted inwardly of the driving part of the electromagnetic coupling in spaced relation therewith, an exciting coil fixed on a protrusion of an intermediate housing within a magnetic pole of the driven part of the electromagnetic coupling, an output shaft coupled to the driven part of the electromagnetic coupling and rotatably supported on the intermediate housing, a tachometer generator mounted on the output shaft, an electromagnetic brake also mounted on the output shaft, and a control device for controlling the electromagnetic force of the electromagnetic coupling and the electromagnetic brake in response to an output signal of the tachometer generator and an output signal issued through a command switch energized upon the instructions of an operator.

12 Claims, 13 Drawing Figures

FIG. 1 PRIOR ART
FIG. 2 PRIOR ART
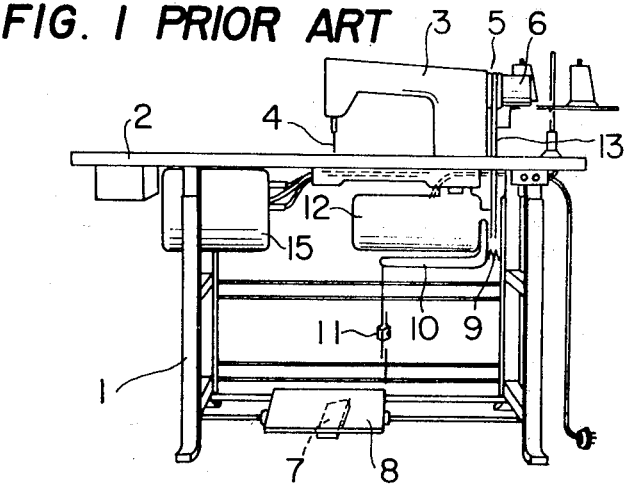
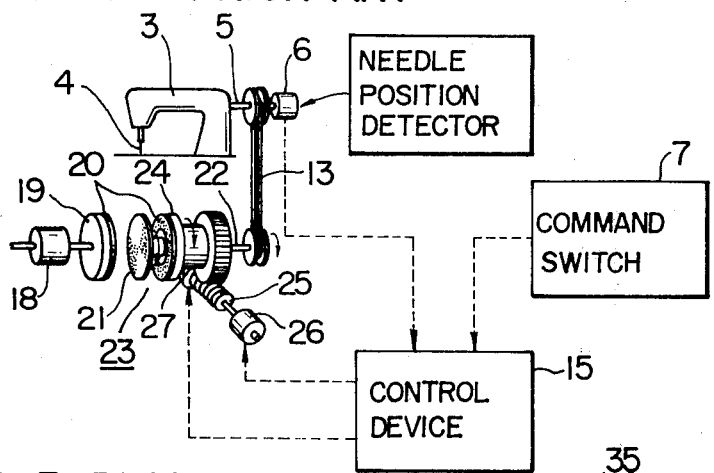
FIG. 3 PRIOR ART
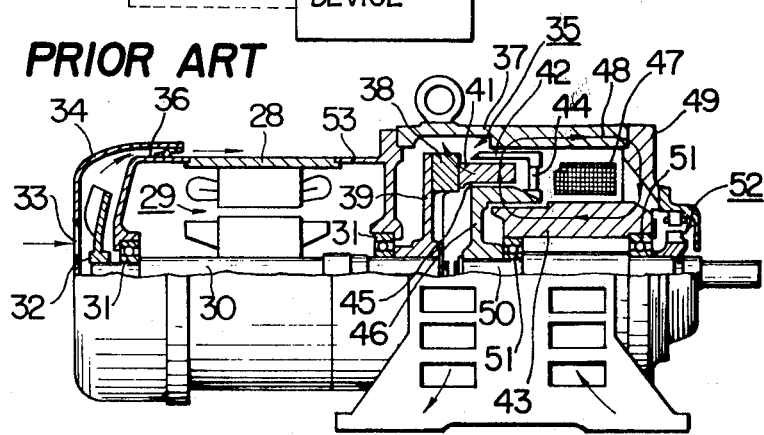

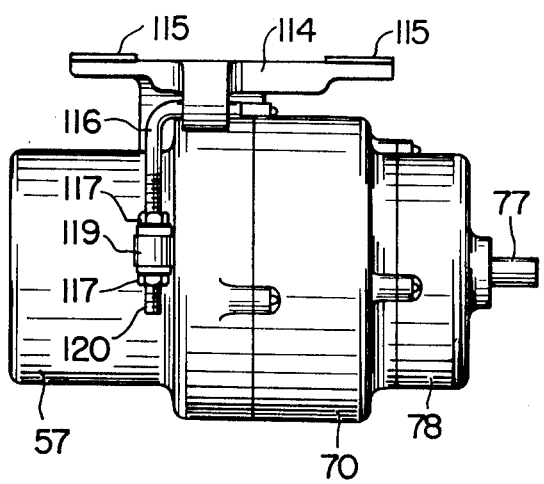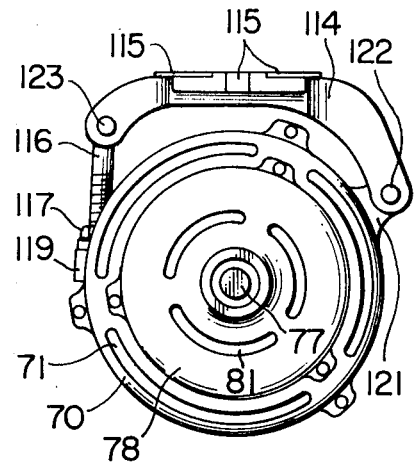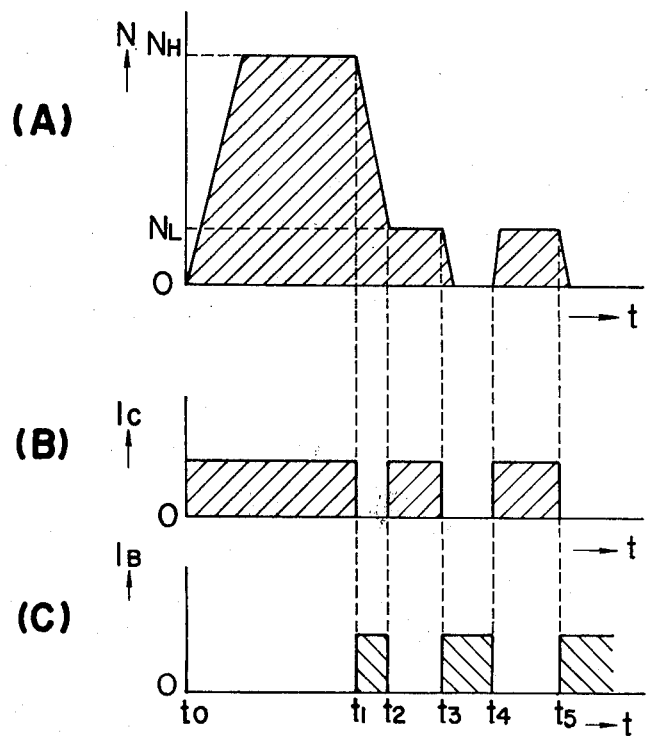

DRIVING SYSTEM FOR A SEWING MACHINE

FIELD OF THE INVENTION

This invention relates to a driving system for industrial sewing machines.

BRIEF DESCRIPTION OF THE DRAWINGS

FIG. 1 is a diagram showing the general construction of a conventional industrial sewing machine.

FIG. 2 is a diagram for explaining a positioning device of a conventional industrial sewing machine.

FIG. 3 shows a partially broken front view of a conventional driving system using an electromagnetic coupling for an industrial sewing machine.

FIG. 8 is a front view showing the driving system according to the present invention.

FIG. 9 is a side view of the driving system of FIG. 8.

FIG. 10 is a graph for explaining the sequence of control operation for the driving system according to the present invention.

DESCRIPTION OF THE PRIOR ART

Figure 4:
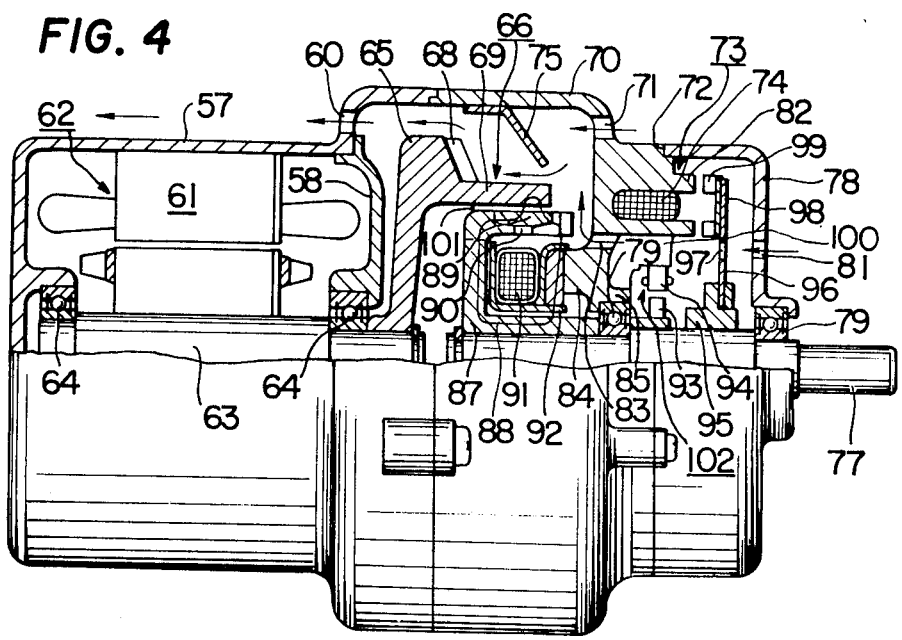
FIG. 4 is a partially broken front view of a driving system according to an embodiment of the invention.

A drive motor for an industrial sewing machine is required to be started and stopped very frequently and in view of this a clutch motor provided with a clutch and brake has been developed. Another important development which is presently in general use in an automatic thread cutter as well as a clutch motor with an automatic needle stop having a positioning device for determining the angle of the needle as the sewing operation is stopped thereby meeting the demand for automation and labor saving in the field of industrial sewing. The above-mentioned clutch motor, however, has the disadvantage that the operator gets easily tired since a clutch return spring must be operated through an operating lever by pressing the pedal for the operation of the clutch and brake of the clutch motor.

The automatic positioning device for the clutch motor of the conventional industrial sewing machine will be explained below with reference to FIGS. 1 and 2.

Reference numeral 12 shows a driving system comprising a flywheel 19, a main motor always rotating with the flywheel 19, a reduction worm gear 25, an auxiliary motor 26, an electromagnetic brake 27, a brake 24 reduced in speed or stopped by the electromagnetic brake 27 and a clutch disc 21 selectively engaging them by manual operation of a lever 10, the clutch disc 21 being connected to a machine shaft or load shaft of the machine 3 through an output shaft 22 and a belt 13. A needle position detector 6 coupled to the machine shaft 5, a control device 15 and a command switch 7 for issuing a command to select the upper or lower position of the needle 4 or to cut the thread in addition to the motor 12 are mounted on legs 1 supporting the table 2 of the machine 3.

The machine shaft 5 of the machine 3 which is rotated at high speed by the motor 18 is reduced in speed sharply to the low speed level of the brake 24 as the clutch disc is pressed against the brake 24, so that the shaft 5 is driven at low speed by the auxiliary motor 26 to a predetermined angle of stoppage to position the needle. The angle of needle position is detected by the detector 6, an output signal of which energizes the electromagnetic brake 27 to stop the output shaft 22, that is, machine shaft 5. Subsequent to the stoppage of the needle at the first stationary position that is assumed here to be the lower position of the needle 4 by way of illustration, following the high speed operation, the operator may operate the command switch 7 on the pedal 8 to move the needle to and stop it at the stationary position, that is, the upper needle position, through the motor 26 and electromagnetic brake 27. Midway of the movement of the needle or subsequent to the stoppage thereof at the second stationary position, a thread cutter (not shown) is actuated thereby to cut the thread.

The motor and machine construction thus far mentioned is well known and has the problem of a high cost as it requires many component elements including the reduction worm gear 25 and auxiliary motor 26.

Also, the intentional slippage of the clutch 23 to achieve a desired high speed level shortens the life of the clutch frictional disc 20 because of the increased temperature of the clutch 23 and requires high skill on the part of the operator.

On the other hand, changing the reduction ratio between the pulleys on the motor 12 and machine 3 is troublesome and makes it difficult to determine an optimum value of positioning speed and thread cutting speeds in a low speed range. Further, in view of the fact that the strength of the clutch return spring 9 is so high as to press the clutch disc 21 against the friction disc 20 to allow transmission of sufficient brake torque, the manual operation of the lever 10 through the connecting rod 11 by the agency of the pedal 8 in opposition to the force of the clutch return spring 9 considerably tires the operator. In addition, if the machine shaft 5 is shifted to high speed erroneously in the middle of thread cutting process, the breakage of needle 4 or other troubles may occur, thereby making it necessary to provide the pedal 8 or the motor 12 with means for mechanical protection, resulting in the complication of the overall construction of the sewing machine.

Explanation will be made below of an example of the driving system employing a well-known electromagnetic coupling with reference to FIG. 3.

A rotary shaft 30 of the motor 29 mounted on the housing 28 is supported on an end bracket 36 through a bearing 31. A cooling fan 32 is mounted on one end of the shaft 30, so that cool air drawn in by the cooling fan 32 through a ventilation hole 33 in a fan cover 34 is applied to the outer periphery of the housing 28 of the motor 29 in the direction shown by the arrow.

On the other end of the shaft 30 is rotatably mounted an inductor 41 of the electromagnetic coupling 35 which in turn is mounted on the rotary side plate 39 through a non-magnetic metal means 38. Reference numeral 50 shows an output shaft which is rotatably supported on a protrusion 43 projected axially of the end bracket 49, through the bearing 51. Drums 42 and 46 of the electromagnetic coupling 35 with the inductor 41 interposed therebetween are rotatably mounted on one end of the output shaft 50, the drums 42 and 36 being connected by a support 44 of non-magnetic material. An exciting coil 47 of the electromagnetic coupling 35 is mounted on the protrusion 43, so that a magnetic path is formed as shown by arrow 48 in the intermediate housing 37 interposed between the end brackets 49 and 53 and in the protrusion 43 of the end bracket 49. Thus the rotational motion of the rotary shaft 30 is imparted to the output shaft 50 through a space 45 between the drums 42 and 46 and inductor 41.

The other end of the output shaft 50 is provided with a tachometer generator 52, through which the revolutions of the output shaft 50 are converted into a voltage and applied to a control device (not shown).

Figure 5:
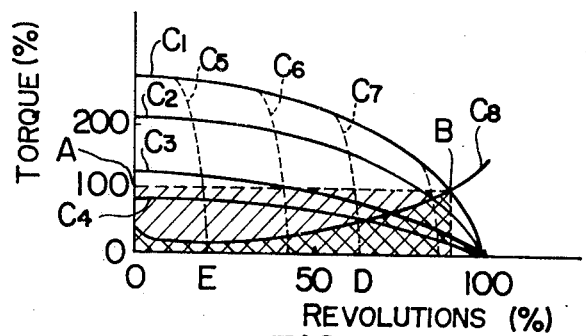
FIG. 5 is a diagram showing the characteristics of an electromagnetic coupling.

The transmission torque characteristics of the motor using the above-mentioned electromagnetic coupling are as shown in FIG. 5. In the graph of FIG. 5, the abscissa and ordinate represent revolutions and torque respectively. When the exciting current in the exciting coil 47 of the electromagnetic coupling 35 is controlled, torque transmitted to the output shaft 50 is subjected to variations as shown by curves $C_1$ to $C_4$. A voltage corresponding to the revolutions of the output shaft 50 is picked up by the tachometer generator 52 and fed back to the control device thereby to control the exciting coil 47, thus achieving the torque characteristic curves $C_5$ to $C_7$ for the electromagnetic coupling 35.

In the above-mentioned motor with the electromagnetic coupling, the operation is limited to the shadowed portion defined by a dashed line A–B below a certain torque level in order to maintain a constant torque characteristic. This is the magnitude of the torque where the inertia not including the load of the output shaft 50 and rotary shaft 30 of the motor 29 are substantially in equilibrium in view of the need for the least possible speed variations and stable operation. Because of this constant-torque characteristic, for the motor of 400W to be operated at a constant torque of 10%, for example, the component elements are designed on the assumption that 360W, that is, 90% of 400W is disposed as a thermal loss through the electromagnetic coupling 35.

As far as the drive motor for the sewing machine is concerned, however, the load torque is small at low speeds as shown by curve $C_8$ of FIG. 5, while its thermal loss is at most 100W for the whole range of speed in the case of, say, a 400W motor. Also, the fact that the sewing machine is started and stopped very frequently requires the inertia on the output shaft side to be approximately one fifth that on the motor side.

SUMMARY OF THE INVENTION

Accordingly, it is an object of the invention to provide a driving system for the sewing machine in which the rotary shaft and the output shaft of the system are connected by an electromagnetic coupling and the force to be transmitted by the electromagnetic coupling is controlled either by an output signal of a tachometer generator connected to the output shaft or the load shaft, that is, machine shaft or by a signal generated by the operator's manual operation of a command switch thereby to electrically control the output shaft, thus accomplishing accurate speed control and simplification of the device.

Another object of the invention is to provide a driving system for the sewing machine in which mechanical clutches are eliminated to lengthen its useful life and facilitate the servicing thereof, so that the operation of clutch return spring indispensable in the conventional clutch motor is not required, thereby reducing the force so far required for the operation of the pedal, thus saving the waste of labor of the operator.

Still another object of the invention is to provide a driving system for the sewing machine including a small and compact electromagnetic coupling in which the driving part of the electromagnetic coupling is provided on an end of the flywheel, a driven part is rotatably mounted within the flywheel, an exciting coil is fixedly mounted axially of the intermediate housing, thereby reducing the inertia of the driven part of the electromagnetic coupling and the output shaft coupled with the driven part, while at the same time eliminating the need for a brush which otherwise might be required to supply electric power to the exciting coil.

A further object of the invention is to provide a driving system for the industrial sewing machine in which the yoke of the exciting coil of the electromagnetic brake and the stator of the tachometer generator are mounted on the bearing support of the intermediate housing, while the rotor of the tachometer generator is mounted on the output shaft opposite to the stator, thus realizing a compact electromagnetic brake and tachometer generator.

An even further object of the invention is to provide a driving system for the sewing machine in which cooling vanes are formed on the outer periphery of the flywheel or the drum of the electromagnetic coupling whereby cool air is drawn in by way of a ventilation hole provided in the end bracket on the output shaft side or in the intermediate housing, which air is exhausted axially of a motor housing around the outer periphery thereof, thus achieving effective cooling of the motor.

According to the present invention, there is provided a driving system for the sewing machine comprising a motor, a flywheel mounted on one end of the rotary shaft of the motor, a driving part for the electromagnetic coupling in drum form axially projected from the end face of the flywheel, a driven part mounted on the output shaft within the driving part of the electromagnetic coupling in spaced relation therewith, an exciting coil for the electromagnetic coupling mounted on the intermediate housing rotatably supporting the output shaft, a tachometer generator and electromagnetic brake mounted on the output shaft, and a control device for controlling the electromagnetic force of the electromagnetic brake and electromagnetic coupling in response to an output signal from either the tachometer generator or the command switch operated by the operator.

DESCRIPTION OF THE PREFERRED EMBODIMENT

The present invention intended to obviate the above-mentioned disadvantage will be explained below with reference to an embodiment thereof shown in the accompanying drawings.

Referring to FIG. 4, a stator 61 of a motor 62 is supported on a motor housing 57, the rotary shaft 63 of the motor being supported at one end thereof on the motor housing 57 through a bearing 64, while the other end thereof is supported on the intermediate end bracket 58 through the bearing 64. On the end of the rotary shaft 63 which projects from the intermediate end bracket 58 is rotatably mounted a flywheel 65. A drum 69 of the electromagnetic coupling 66 is projected from the end of the flywheel 65 while a cooling fan 68 is provided on the outer periphery of the drum.

One end of the output shaft 77 is supported on the end bracket 78 through the bearing 79, the other end thereof being supported on the support 85 of the intermediate housing 70 through the bearing 79, the support 85 being engaged with the motor housing 57. The outer periphery of the end bracket 78 is fixed on a recess 72 provided on the intermediate housing 70. A magnetic pole 89 of the electromagnetic coupling 66 is fastened through the yoke 87 at a position where the output shaft 77 projects to the motor side from the support 85 of the intermediate housing 70, while the exciting coil 91 is fixed on the projection 84 of the bearing support 85 of the intermediate housing 70 through the coil yoke 92 within a space defined by the yoke 87 and the magnetic pole 89. As a result, the magnetic fluxes formed by the exciting coil 91 make up a magnetic path 88 from the coil yoke 92, magnetic pole yoke 87, magnetic pole 89, space 101 between magnetic pole 89 and drum 69, drum 69 and adjacent magnetic pole 89 to the coil yoke 92.

On the other hand, the rotor 93 of the tachometer generator 102 and the rotary body 95 of the electromagnetic brake 73 are rotatably mounted on the output shaft 77 between the bearings 79. The stator 94 opposed to the rotor 93 of the tachometer generator 102 is fixed on the protrusion 100 on the bearing support 85 of the intermediate housing 70.

A frictional member 99 of the rotary body 95 of the electromagnetic brake 73 is connected to the output shaft 77 through the support spring 96 for the magnetic body 98, the frictional member 99 being disposed opposite the intermediate housing 70 comprising the yoke 82 of the electromagnetic brake 73. The exciting coil 74 of the electromagnetic brake 73 is contained in the yoke 82 formed by the protrusion of the intermediate housing 70, so that the magnetic fluxes due to the exciting coil 74 flow through a magnetic path comprising the yoke 82, frictional member 99 and magnetic body 98, thus forcing the support spring 96 toward the left in the drawing to press the frictional member 99 against the end of the yoke 82 thereby to generate a braking force.

The end bracket 78 is provided with ventilation holes 81 opposite ventilation holes 97 of the support spring 96 of the electromagnetic brake and the ventilation holes 83 of the intermediate housing 70, so that the cool air absorbed by way of the ventilation hole 71 on the outer periphery of the intermediate housing 70 flows in the axial direction as shown by arrow by means of the vanes 68 of the flywheel 65 and is exhausted by way of ventilation holes 60 of the motor housing 57 to cool the electromagnetic brake 73, electromagnetic coupling 66 and the motor 62 through the outer periphery of the housing 61. In the process, the fan guide 75 provided within the intermediate housing 70 contributes to the effective introduction of the cool air from the ventilation hole 71 to the electromagnetic coupling 66.

Figure 6:
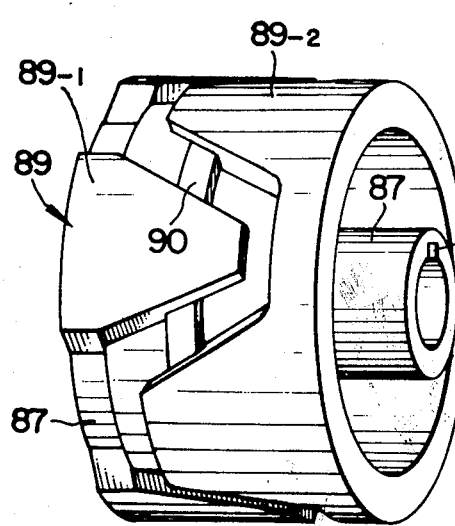
FIG. 6 is an enlarged perspective view showing the magnetic pole of the electromagnetic coupling.
Figure 7:
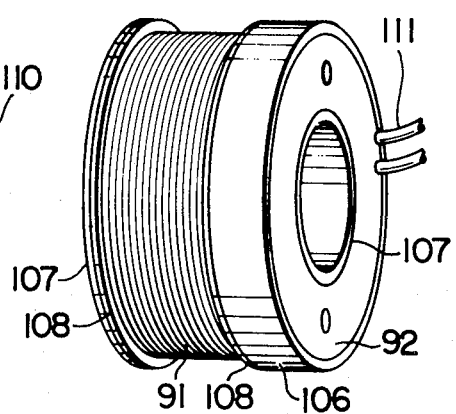
FIG. 7 is a perspective view showing the exciting coil of the electromagnetic coupling.

The electromagnetic coupling 66 will be explained more in detail with reference to FIGS. 6 and 7. An exciting coil 91 is supported in an annular shape by coil support frames 106 and 107 with an insulating material 108 between the coil and the support frames. The magnetic yoke 87 and the output shaft 77 which is inserted into the yoke 87 are adapted to be inserted into a center hole of the coil support frame 107. The yoke 92 is attached, at the ends of the exciting coil 91, to the support frames 106 and 107, so that lead wires 111 of the coil 91 are taken out from holes provided in the yoke 92.

The magnetic pole 89 comprises magnetic pole pieces 89-1 and 89-2 in opposed relation which are coupled by the magnetic material 90. The yoke 87 of the magnetic pole 89 is fastened to the output shaft 77 by means of a key way 110.

The motor 62 is mounted on the motor base 114 as shown in FIGS. 8 and 9, the motor base comprising a plurality of holes 115 through which the base 114 is mounted on the back of the machine table 2 shown in FIG. 1. One end of the motor base 114 is rotatably mounted on a protrusion 121 on the outside of the motor housing 57 by means of a pin 122, while the other end thereof rotatably engages an L-shaped rod 116 having a threaded portion 120 on the end thereof through a hole 123.

The L-shaped rod 116 is passed through a hole in the protrusion 119 on the outside of the motor housing 57 and adjustably supported by the nut 117 at the threaded portion 120 thereof.

By adjusting the position of the L-shaped rod 116 by means of the nut 117 in cooperation with the protrusion 119 of the motor housing 57, the space between the base 114 and output shaft 77 can be adjusted to determine as required the length and tension of the belt connecting the output shaft 77 and the machine shaft 5.

The operation of the driving system according to the invention with the above-mentioned construction will be explained with reference to FIGS. 10 and 11. Referring first to FIG. 10, graph (A) shows a characteristic of the driving system in which the abscissa and ordinate represent time and the revolutions N of the sewing machine or output shaft 77 respectively. In graph (B), the ordinate represents current Ic flowing in the exciting coil 91 of the electromagnetic coupling 66, while current $I_B$ in the exciting coil 74 of the electromagnetic brake 73 is represented by the ordinate in graph (C), both graphs (B) and (C) showing energized states apart from the magnitude of the currents.

Now assume that the motor 62 is rotating with the flywheel 65. The operator's operation of the command switch 7 (FIGS. 1 and 2) to produce electric current in the exciting coil 91 of the electromagnetic coupling 66 at time $t_0$ causes the energy stored in the flywheel 65 and output from the rotary shaft 63 of motor 62 to be imparted to the output shaft 77, and as a result the sewing machine achieves high-speed revolutions $N_H$ within a short time.

At time $t_1$ after start of the operation when the command switch 7 is operated at the revolutions $N_H$, current Ic in the exciting coil 91 of the electromagnetic coupling 66 is cut off and current $I_B$ flows in the exciting coil 74 of the electromagnetic brake 73, with the result that the output shaft 77 is braked and decelerated by the electromagnetic brake 73 as shown in (A) of FIG. 10.

The operation of the command switch 7 on this occasion is such that the revolutions of the motor are shifted from the high level of $N_H$ to a low level $N_L$. When the output shaft 77 reaches the predetermined level $N_L$ of revolutions at time $t_2$, current $I_B$ in the exciting coil 74 of the electromagnetic brake 73 is cut off again, so that current Ic flows in the exciting coil 91 of the electromagnetic coupling 66. After continuing the operation at low revolutions $N_L$ for positioning the needle 4 (FIG. 1) at a predetermined point, current is made to flow again in the exciting coil 74 of the electromagnetic brake 73 by a signal from a needle position detector 6 at time $t_3$ to stop the needle 4 at the first position.

As to the relocation from first to second positions, operation at time $t_4$ of the command switch 7 produces current Ic in the exciting coil 91 of the electromagnetic coupling 66 thereby to rotate the output shaft 77 at low revolutions, so that at time $t_5$ when the needle position detector 6 is energized, current is transferred from the electromagnetic coupling 66 to the exciting coil 74 of the electromagnetic brake 73 to stop the needle 4 at the second position.

Thus the switching operation of the command switch 7 is performed easily by the operation of the pedal 8 (FIG. 1).

Figure 12:
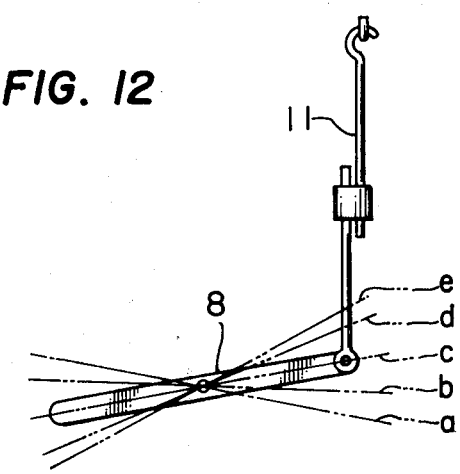
FIG. 12 is a diagram showing stationary positions of a pedal of the industrial sewing machine taken in its operation.
Figure 13:
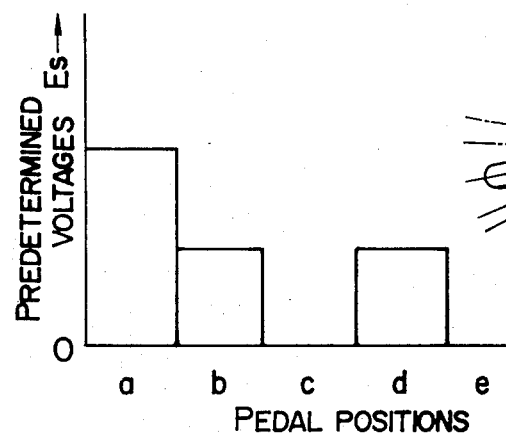
FIG. 13 is a graph showing the relation between the stationary positions and predetermined voltages $Es$.

The pedal 8 has stationary positions a;b and d;e downwardly and upwardly of the stationary position c respectively as shown in FIG. 12 and therefore the command switch 7 can be operated in such a manner as to determine various levels of voltage Es in accordance with the pedal positions as shown in FIG. 13.

Figure 11:
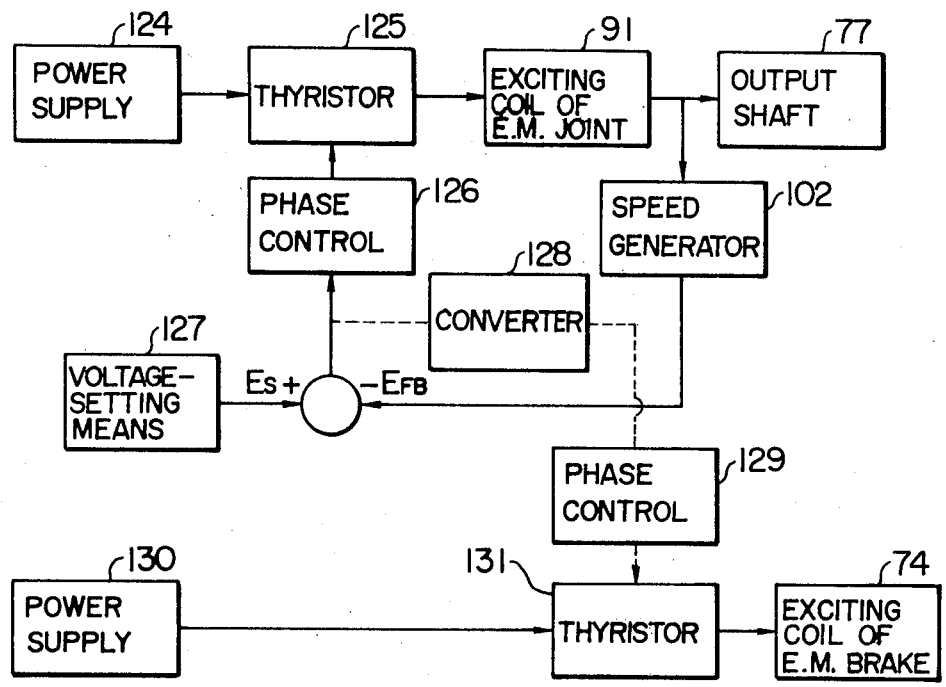
FIG. 11 is a block diagram showing a control device for the driving system according to the invention.

The control operation described above is performed by the system arrangement illustrated by the block diagram of FIG. 11. In this drawing, the exciting coil 91 of the electromagnetic coupling 66 is connected through a thyristor 125 to a power supply 124, so that the turning effort of the motor 62 proportional to the excited current is transmitted to the output shaft 77.

The rotational speed of the output shaft 77 is detected by the tachometer generator 102 to generate a voltage $E_{FB}$ corresponding to the rotational speed. The voltage $E_{FB}$ is compared with a predetermined command voltage Es of a voltage-setting device 127, and the difference, that is, $Es - E_{FB}$ is used to control the phase control device 126 of the thyristor 125. It will be understood that the tachometer generator 102 may be mounted on the output shaft 77 or on the machine shaft 5 as desired.

The relationship between the torque transmitted through the electromagnetic coupling thus controlled and the speed thereof is as shown by curves $C_5$ to $C_7$ of FIG. 5. As will be apparent from the drawing, the number of revolutions of the output shaft 77 per unit time can be changed along the curves $C_5$ to $C_7$ by varying the predetermined voltage Es.

It will also be seen from FIG. 10 that the command to shift the revolutions from high level $N_H$ to low level $N_L$ is issued by varying the command voltage Es through the operation of command switch 7.

At point D of FIG. 5 where the curve $C_7$ intersects the X-axis, the transmission of the electromagnetic coupling 66 is zero and the difference between the output $E_{FB}$ of the tachometer generator 102 and the predetermined voltage Es in FIG. 11 is below a predetermined level, so that the thyristor 125 is not fired. In other words, the output voltage $E_{FB}$ of the tachometer generator 102, for example, is higher than the predetermined voltage Es.

This is also the case with the point E of curve $C_5$. In the event that a command is issued to shift from the high-speed operation on the curve $C_7$ to the low-speed operation on the curve $C_5$ by varying the predetermined voltage Es with the command switch 7, the difference between the predetermined voltage Es and output $E_{FB}$ of the tachometer generator 102 is below a predetermined level and therefore the thyristor 125 is prevented from being fired unless the revolutions are reduced to a level corresponding to point E. This de-energized state of thyristor 125 corresponds to the time period $t_1$ to $t_2$ in FIG. 10. The fact that the difference $Es - E_{FB}$ is below a predetermined level is detected through a converter 128 the output of which is used to control the phase control circuit 129 for the thyristor 131 connected to the power supply 130. Thus the firing angle of the thyristor 131 is controlled and the amount of current flowing in the exciting coil 74 of the electromagnetic brake 73 is regulated thereby to energize the electromagnetic brake 73 for the time period $t_1$ to $t_2$ in FIG. 10. On the other hand, the electromagnetic brake 73 is maintained inoperative during the periods $t_0$ to $t_1$ and from $t_2$ to $t_3$ when the electromagnetic coupling 66 is in operation.

The converter 128 which is energized in response to the difference between predetermined voltage Es and output voltage $E_{FB}$ of tachometer generator 102 may alternatively operatively connected to the output of the thyristor 125 for detection.

In the circuit of FIG. 11, it is also easy, by introducing the signals from the needle position detector 6 and command switch 7, to perform the operation similar to that achieved by the circuit of FIG. 10. Further, the high-speed revolutions $N_H$ may be selected in a plurality of stages if a plurality of corresponding levels of voltage Es are determined in accordance with the degree to which the pedal is pushed.

Furthermore, it is not in opposition to the force of clutch return spring 9 but merely in response to the signal from the command switch 7 that the foot pedal 8 is pushed, and therefore the pedal may be operated at a light touch.

What is more, any operating failure during a thread-cutting operation is protected not by mechanical means but easily by electrical means in which the rotation of the output shaft 77 is regulated by controlling the exciting current in the exciting coil 91 of the electromagnetic coupling 66.

It will be seen from the above description that according to the present invention an electromagnetic coupling with its speed made variable by means of a tachometer generator and an electromagnetic brake maintained inoperative during the energized state of the electromagnetic coupling are mounted on the output shaft 77 to impart the turning effect of the output shaft 77 to the sewing machine proper, and therefore a low-cost sewing machine simple in construction is realized on the one hand and the provision of the means for electrically protecting the machine from an operating failure assuring a highly accurate fail-safe system on the other. Also, in view of the fact that no frictional plate is used in the clutch, not only the useful life of the machine is long but also its maintenance and inspection is easy. Further, simple operation of the pedal permits the fatigue of the operator to be sharply reduced.

I claim:

1. A driving system for a sewing machine comprising: a motor included in a motor housing having a stator fixed on said motor housing, a rotor rotatably arranged opposedly to said stator and a rotary shaft connected to said rotor and supported on said motor housing through a bearing; an electromagnetic coupling including a driving part mounted on one end of said rotary shaft of said motor and interlocked with said rotary shaft, and a driven part rotatably disposed inwardly of said driving part in spaced relationship therewith; an intermediate housing fitted on one end of said motor housing; an output shaft supported on said intermediate housing through a bearing and having said driven part mounted thereon; said electromagnetic coupling having an exciting coil fixed on said intermediate housing; an electromagnetic brake including a rotor connected to said output shaft; a tachometer generator including a rotor also connected to said output shaft; a command switch energized in reponse to a command by the operator; and means for regulating the electromagnetic force of said electromagnetic coupling and said electromagnetic brake in response to a signal either from said command switch or from said tachometer generator.

2. A driving system for the sewing machine according to claim 1, in which when said electromagnetic coupling is in an excited condition, said electromagnetic brake is in a de-energized state, and vice versa, both being controlled by said control means in response to signals from said tachometer generator and said command switch.

3. A driving system for the sewing machine according to claim 1, in which said command switch for regulating the excitation of said electromagnetic coupling and said electromagnetic brake through the control means is interlocked with an operating pedal of the sewing machine and is adapted to produce at least two different signals.

4. A driving system for the sewing machine according to claim 1, in which said electromagnetic coupling comprises a driving part including a drum axially projecting from an end of a flywheel mounted on one end of the rotary shaft of said motor and a driven part including a magnetic pole opposed in spaced relation with the inner periphery of said drum inwardly thereof, said driven part having a yoke directly secured to said output shaft, said driving part and said driven part of said electromagnetic coupling being excited through an exciting coil axially provided in said intermediate housing supporting said output shaft.

5. A driving system for the sewing machine according to claim 1, in which a plurality of cooling vanes are provided on the outer periphery of a flywheel mounted on the rotary shaft of said motor, and the cooling air is exhausted along the outer periphery of said motor housing axially thereof through an air passage comprising a plurality of ventilation holes provided on said intermediate housing and on an end bracket on the output shaft side of said motor.

6. A driving system for a sewing machine comprising: a motor having a housing, a stator fixed on said motor housing, a rotary shaft supported by said motor housing, and a rotor disposed on said rotary shaft and arranged rotatably and oppositely to said stator;

an intermediate housing fitted on one end of said motor housing;

an output shaft supported by said intermediate housing and arranged on the same axis as said rotary shaft of said motor;

an electromagnetic coupling including a driving part mounted on one end of said rotary shaft of said motor, a driven part mounted on said output shaft and arranged rotatably and oppositely to said driving part with a gap therebetween, and an exciting coil fixed inwardly to one of the side walls of said intermediate housing for producing magnetic flux passing a magnetic path consisting of said driving part, said driven part and said gap;

an electromagnetic brake including an exciting coil fixed outwardly to said one of the side walls of said motor housing, and a magnetic body, provided oppositely to said exciting coil, having a friction member and supported by a spring support fixed on said output shaft;

a tachometer generator disposed within said intermediate housing for detecting the rotational speed of said output shaft;

a command switch energized in response to a command by an operator; and means for regulating the electromagnetic forces of said electromagnetic coupling and said electromagnetic brake in response to at least one of signals from said command switch and from said tachometer generator.

7. A driving system according to claim 6, wherein when said electromagnetic coupling is in an excited condition, said electromagnetic brake is in a de-energized condition and when said electromagnetic coupling is in a de-energized condition, said electromagnetic brake is in an energized condition, both said electromagnetic coupling and said electromagnetic brake being controlled by said control means in response to signals from said tachometer generator and said command switch.

8. A driving system according to claim 7, wherein said command switch provides a plurality of predetermined output signals in accordance with an operating pedal position of the sewing machine, comparison means for comparing the output signals of said command switch and said tachometer generator for providing an output signal indicative of the difference therebetween, and first and second means for respectively controlling the excitation condition of said electromagnetic coupling and said electromagnetic brake in accordance with the output signal of said comparison means.

9. A driving system according to claim 8, wherein said first means includes power supply means connected to thyristor means for providing an exciting signal to said electromagnetic coupling and phase control means responsive to the output signal of said comparison means for controlling the firing phase of said thyristor means, and said second means includes power supply means connected to thyristor means for providing an exciting signal to said electromagnetic brake and converter means responsive to the output signal of said comparison means for providing an output signal to a phase control means for controlling the phase of firing of said thyristor means.

10. A driving system according to claim 6, wherein said command switch for regulating the excitation of said electromagnetic coupling and said electromagnetic brake through the control means is interlocked with an operating pedal of the sewing machine and is adapted to produce at least two different signals.

11. A driving system for a sewing machine according to claim 6, wherein said driving part comprises a drum axially projecting from a flywheel mounted on said one end of the rotary shaft of said motor, and said driven part includes a magnetic pole arranged inside of said drum in spaced and opposite relation to the inner peripheral surface of said drum and secured to said output shaft through a yoke fixedly secured to said output shaft.

12. A driving system according to claim 6, wherein a plurality of cooling vanes are provided on the outer periphery of a flywheel mounted on the rotary shaft of said motor, and cooling air is exhausted along the outer periphery of said motor housing axially thereof through an air passage comprising a plurality of ventilation holes provided on said intermediate housing and on an end bracket on the output shaft side of said motor.

* * * * *